Oct. 24, 1944. L. EDELMANN ET AL 2,361,091
PARTS HANDLING AND MAKING MACHINE
Filed Dec. 29, 1939 8 Sheets-Sheet 4

INVENTORS
Leo Edelmann and
Thomas T. Tobin
BY
ATTORNEY

Patented Oct. 24, 1944

2,361,091

UNITED STATES PATENT OFFICE 2,361,091

PARTS HANDLING AND MAKING MACHINE

Leo Edelmann and Thomas T. Tobin, Chicago, Ill.

Application December 29, 1939, Serial No. 311,642

9 Claims. (Cl. 77—5)

Our invention relates to a parts handling, and making machine, and particularly to a machine and mechanism intended and adapted for use to receive and hold and work upon parts or pieces or articles while being tapped or threaded or being otherwise worked upon or shaped or formed or made by use or operation of drilling, threading, shaping, or other mechanism.

An object is to provide a machine of this character with which a plurality of parts or pieces or articles are handled and carried into position to be worked or operated upon, and are then moved to a position for discharge or removal, together with operating controls for the drilling, threading, shaping, or other mechanism so that the operation will be synchronized and will be substantially automatic.

Another object is to so construct the parts that this improved mechanism, and the controls therefor, can be applied to and used with an ordinary drill press or other standard machining or operating mechanism.

Still another object is to provide a work holding or supporting table carrying a plurality of means for holding the parts or articles to be worked upon, together with operating and control means whereby said table is actuated to successively bring the several parts into position for drilling, threading, tapping, shaping or other operations to be performed thereon.

Yet another purpose is to provide control or operating means for synchronizing operation of the drilling or other mechanism so that the operations upon the part or the piece will be completed while the table is in a station or position presenting the part or piece for the particular operation.

Another purpose is to provide for automatically ejecting or removing the parts or pieces after the work or operation thereon has been accomplished.

Still another object is to provide for reception and holding of parts or pieces or articles of different sizes and shapes and configurations.

A further object of our invention is to provide a parts handling and making machine capable of attachment or application to and use with drill presses, shapers and other operating mechanisms or machines of usual form and construction, and which is at the same time of simple and inexpensive construction, and can be attached and operated without unusual operations or complications, thus providing a machine that can be installed and used at low cost, and which will materially speed up operations due to the fact that the operation is substantially entirely automatic.

A still further object is to provide means and mechanism of this character so constructed and functioning that two or more operations can be carried out or accomplished upon each part or piece.

With the above and other objects and purposes in view, some of which will be apparent to those skilled in the art, and others of which are inherent in the construction and use and assembly of the parts, our invention includes certain novel features of construction and combinations and arrangements and associations of parts which will be hereinafter set forth in connection with the drawings and then pointed out in the claims.

In the presently illustrated adaptation, our invention is shown as applied to and used with a drill press structure, and in this embodiment the base 1 has a supporting standard 2 rising therefrom with a head portion 3 carried by the standard. A spindle 4 is rotatably mounted in a suitable bearing of the head 3, and a chuck 5 carried by this spindle is adapted to receive and operate a drill 6, a tap, or other desired tool or working part. The spindle 4 is rotated through the medium of an electric motor 7, or in any other desired and suitable manner, and a tool feed lever or wheel structure is provided at 8. If desired, an automatic tool reverse can be provided, as at 9. To all intents and purposes, the parts as described can be of usual and ordinary construction, and other types, and our invention is capable of application to and use with types and constructions of working machines or mechanisms other than drill presses.

A supplemental or supporting base 10 is mounted and is preferably fixed rigidly upon the base 1, and this supporting base 10 has thereon a supporting and bearing case 11. A tubular housing 12 rises from the case 11 and at its top has a bearing head 13. A shaft 14 is revolubly mounted in suitable bearings 15 and 16 provided in or carried by the bearing case 11 and the bearing head 13, and the parts are so located or positioned and mounted that the shaft 14 has the axis thereof extending substantially parallel with the axis of rotation of the spindle 4, the shaft 14 being offset or staggered to locate the drill or other working tool 6 at one side of and out of alignment with the axis of rotation of the shaft.

Figure 5:
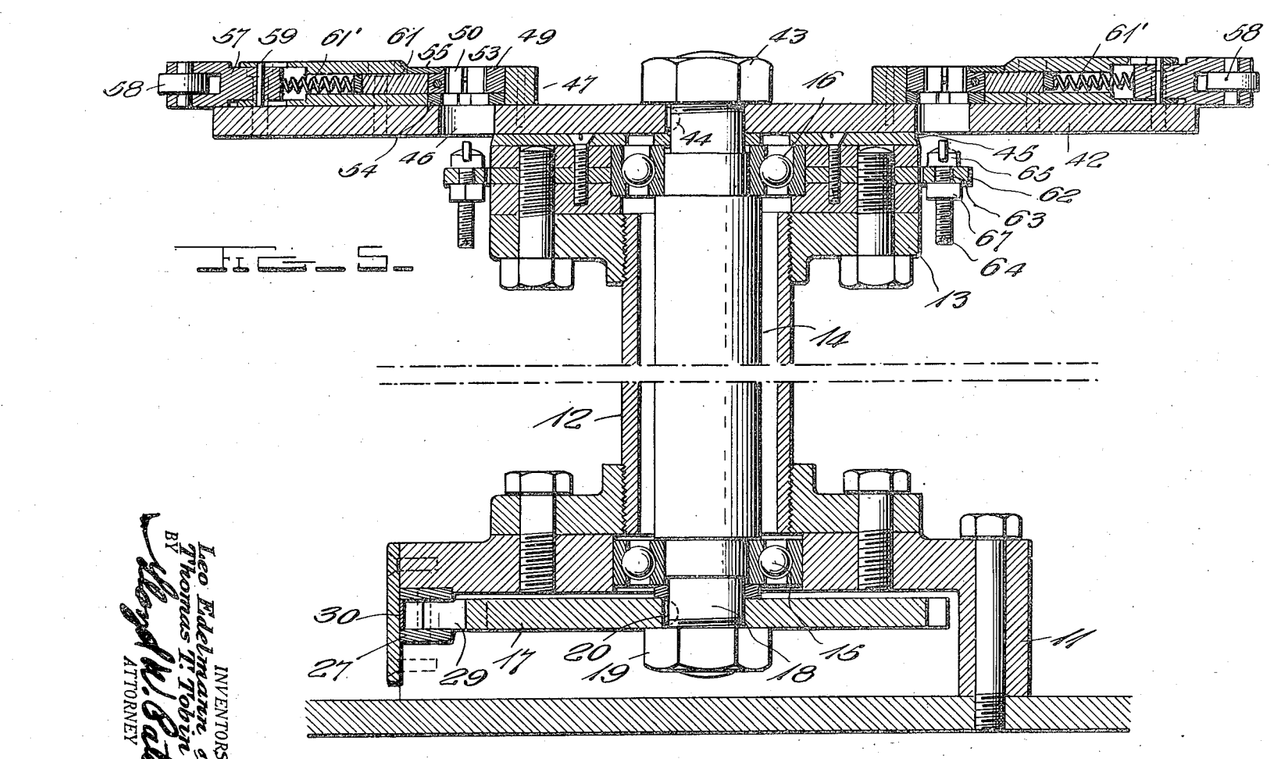
Fig. 5 is an enlarged transverse vertical sectional view through the base and work supporting table and parts associated therewith.

In use, it is contemplated that parts or pieces or articles to be tapped or threaded or otherwise worked upon or shaped or formed by means of the tool 6, or some other suitable working tool, will be advanced by step-by-step rotation of the shaft 14, and parts associated therewith, to be brought into position to be worked upon, and to accomplish this step-by-step rotation of the shaft we provide on the shaft 14 a toothed ratchet wheel 17, which ratchet wheel is keyed or otherwise fixed to rotate with the shaft. As is shown in Fig. 5, the shaft 14 can be reduced toward its end, as at 18 to be received in an opening in the ratchet wheel 17, and a nut 19 can be turned onto the outer threaded extremity of this portion 18. At the same time, this assembly of the parts can be employed to mount in place and secure a ball race member forming part of the bearing at 15. As stated, it is preferable that the ratchet wheel 17 be keyed to the shaft 14, as by means of the key 20, or other suitable means. A shaft 21 is mounted in suitable bearings 22 on the supporting base member 10 to turn on a substantially horizontal axis, and this shaft can be rotated at any desired speed and in any desired manner from a motor 23, or other suitable power means. In the present instance we have shown a sprocket chain 24 working over a sprocket wheel 25 on the shaft 21, and a speed reducing sprocket gear 26 operated from the motor 23, but it will be appreciated that any suitable and desired drive and speed governing means or arrangement can be employed.

A slide rod 27, mounted for reciprocatory movement in a suitable slide bearing 28 at one side of the case 11, carries a pawl 29 normally resiliently pressed out by spring 30 into position to engage the teeth of the ratchet wheel 17, the spring being sufficiently weak to allow the pawl 29 to swing back and clear the teeth of the ratchet wheel 17 for return movement. An eccentric disk 31 secured on the shaft 21 has an eccentric pin 32 thereon, and a pitman rod 33 pivotally connected at one end on this eccentric pin 32 has its remaining end pivotally connected with one end of the slide rod 27. The swing of the eccentric pin 32 is such that as the shaft 21 is rotated the slide rod 27 will be reciprocated to cause the pawl 29 to engage with the teeth of the ratchet wheel 17 to turn this wheel and consequently rotate the shaft in step-by-step movement as may be desired and suitable for cooperation with other parts and mechanisms to be hereinafter more fully described.

As has been stated, the supporting bearing case 11 is so mounted that the shaft 14 rotates on an axis somewhat offset from the axis of rotation of the spindle 4, and the housing 12 can be steadied or supported in any desired manner, as by means of the cross or connecting and supporting member 34, or by other suitable means or parts. This connecting member 34 is in the present instance shown as provided at its ends with socket openings 35 and 36 that will fit the supporting standard 2 and the housing 12, connecting yokes 37 and 38 being provided to be secured at the ends of this connecting member 34, by means of screws 39, or other suitable fastenings, and being provided with openings 40 and 41 to cooperate with the openings 35 and 36 and thus rigidly hold the housing 12 in the desired spaced relation with respect to the standard 2.

A table 42 is mounted on the upper end of the shaft 14, being held in place thereon by a clamping nut 43, and being located and secured to rotate with the shaft through key 44. The bearing head 13 has a widened bearing ring 45 thereon adjacent to which the table 42 rotates, and this bearing ring 45 will prevent lateral swinging or twisting of the table 42.

This table 42, being thus keyed on the shaft 14, will be rotated in step-by-step movement by the ratchet wheel 17 and the pawl 29, and the table is intended and adapted to receive and support and carry parts or articles to be worked or operated upon and to present one of these parts in substantially registered position with respect to the tool 6, when the table pauses in the intervals between the step-by-step rotational movement thereof. Thus, the table, and its associated parts, will bring all of the articles or parts as placed or carried thereon successively into position to be worked or operated upon by the tool 6.

In the present instance we have shown the mechanism as adapted to accomplish step-by-step rotation of the table 42 with twelve intervals of pause between such movement, and consequently twelve article receiving and holding parts will be provided. It is preferable that the table 42 have a plurality of openings 46 formed therethrough and a peripheral series around the rotating center of the table and at points so that these openings will substantially register axially with the axial center of rotation of the tool 6 in each of the intervals of pause. With some parts and under some circumstances, it may not be necessary to provide openings at 46; but, as this machine is intended to be adjustable and adaptable to take long and short articles or parts or members of different forms and sizes, the openings 46 will permit the parts or articles to be located and held without the entire length extending or protruding above the top of the table 42. At each article holding and work stage, or in other words adjacent to each opening 46, the clamp housings 47 are mounted and carried upon the top of the table 42. These clamp housings 47 are secured upon the table 42 by means of screws, bolts, or other suitable fastenings, and are disposed in substantially radiating arrangement around the axis of rotation of the table. Each clamp housing 47 has an opening 48 therein substantially aligned with the corresponding opening 46 of the table, and within this opening a fixed article or part receiving and holding jaw 49 is mounted. A movable clamping jaw 50 is provided in each of the openings 48 to mate and cooperate with the fixed jaw 49. The jaw 50 is slidable toward and away from the fixed jaw 49, and springs 51 are provided to normally resiliently exert force to draw or move the jaw 50 to the open or separated position. In the present instance, we have shown the jaw 49 as held in place by screws or bolts or other suitable fastenings 52, and the movable jaw 50 retained in proper position by sliding pins 53 and by plates 54 and 55, and the springs 51 are illustrated as being attached to a pin 56 passing through the movable jaw 50 and having its ends slidably extending through slots in the jaw housing 47.

A plunger head 57 is slidably mounted in the housing 47 to extend from the outer end thereof and preferably beyond the peripheral edge of the table 42, and this plunger head carries an antifriction roller 58 at its outer end. The plunger head is suitably held against rotational movement by pin 59 traveling in slots 60 in the housing 47. A push rod 61 is endwise slidably fitted in the housing 48 between the outer side of the movable clamp jaw 50 and the inner end of the plunger head 57. With this construction and arrangement, the springs 51 normally hold the movable jaw member 50 in the open or separated position, and the push rod 61 serves to move the plunger head 57 to the outwardly extended position. Obviously, as pressure is exerted upon the roller 58, and the plunger head 57 is moved inwardly, the push rod 61 will overcome the resilient force of the springs 51 and will move the jaw 50 to the closed position.

Figure 1:
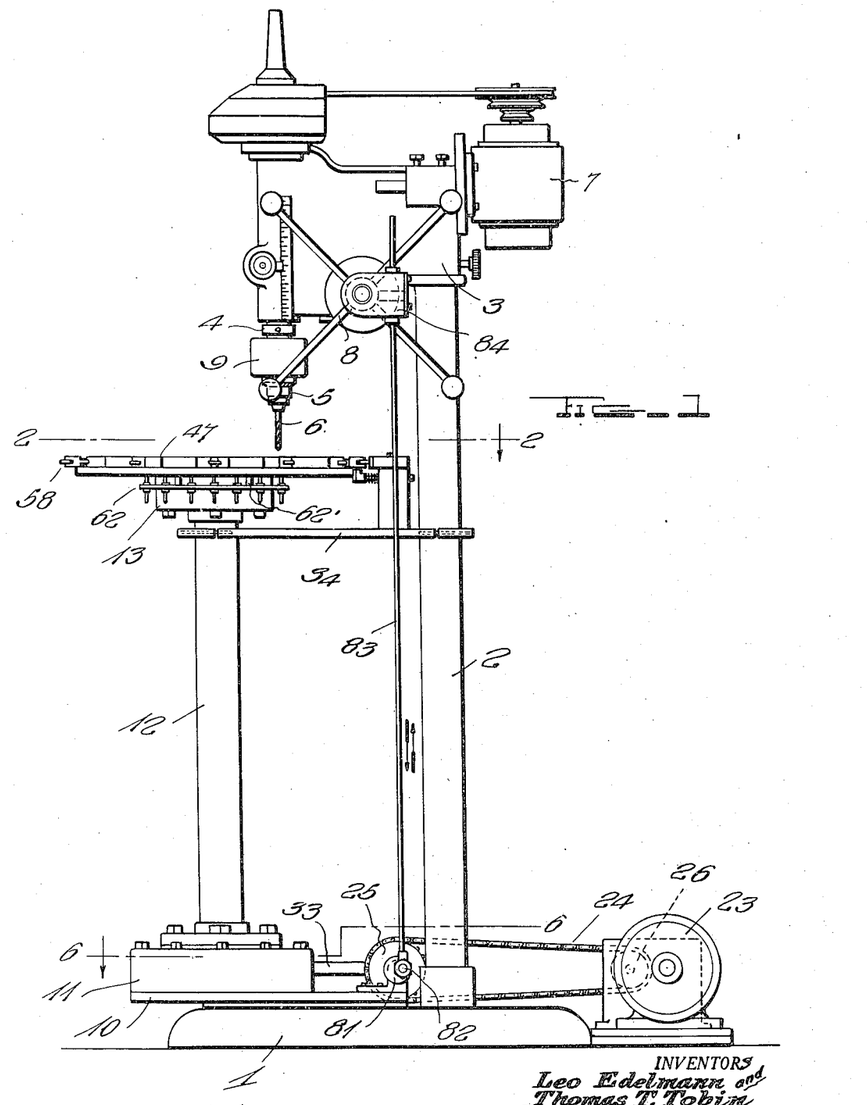
Figure 1 is a view in side elevation of a machine showing embodiment of our invention.
Figure 2:
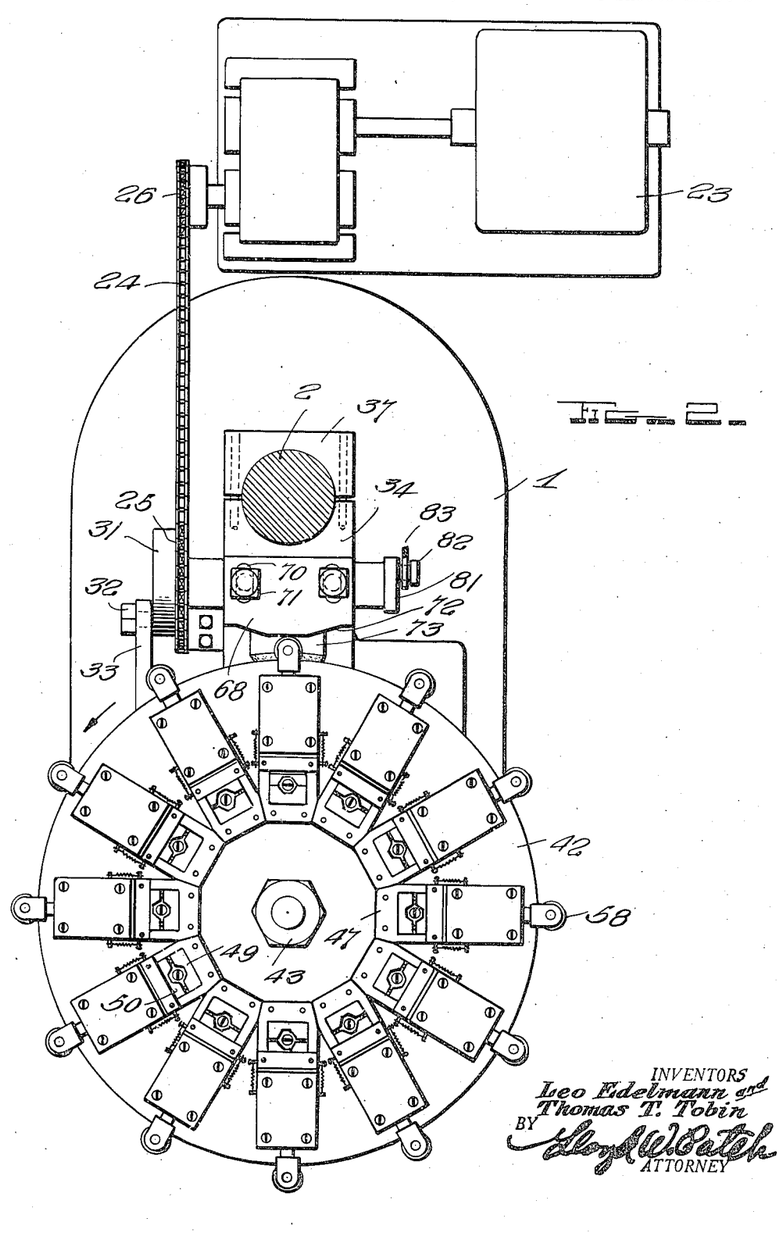
Fig. 2 is an enlarged plan and transverse sectional view substantially on line 2—2 of Figure 1.
Figures 6, 7, 8, 9:
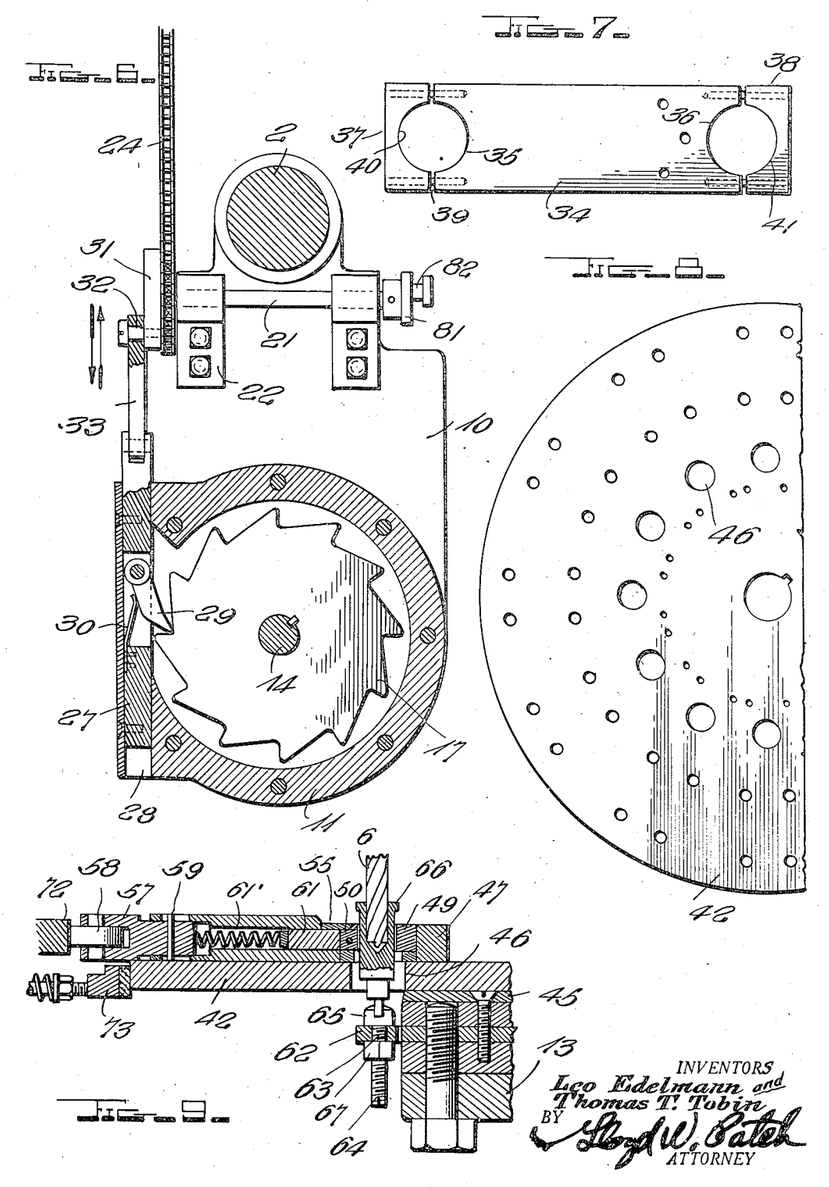
Fig. 6 is a horizontal sectional view substantially on line 6—6 of Figure 1.
Fig. 7 is a plan view showing the table connecting link means.
Fig. 8 is a plan view, partly broken away, of the work supporting table before parts are assembled thereon.
Fig. 9 is an enlarged sectional view substantially radially through an edge of the work supporting table and one of the part or article receiving and holding means, showing an article in place therein and illustrating a drill in position to work or operate upon the part.
Figures 10, 11:
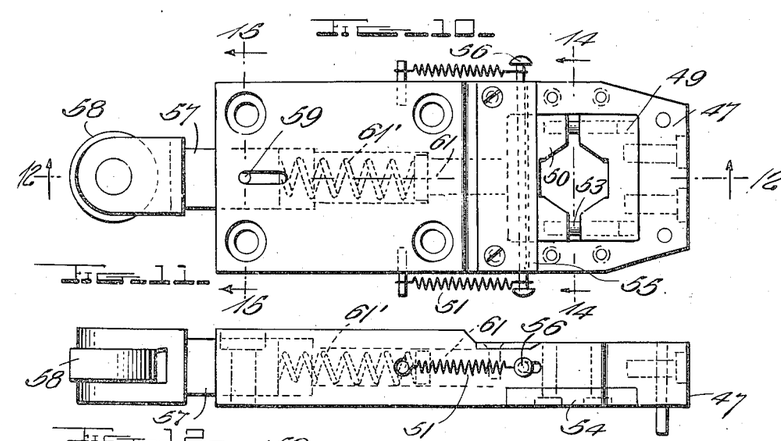
Fig. 10 is an enlarged top plan view of one of the article or part receiving and holding or clamping means.
Fig. 11 is a view in edge elevation of the showing in Fig. 10.
Figure 12:
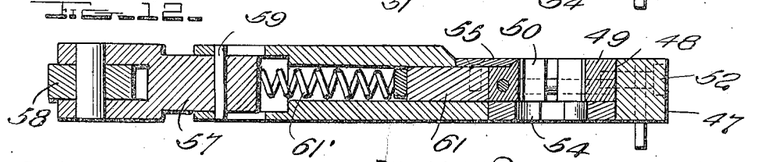
Fig. 12 is a longitudinal sectional view substantially on line 12—12 of Fig. 10.
Figure 13:
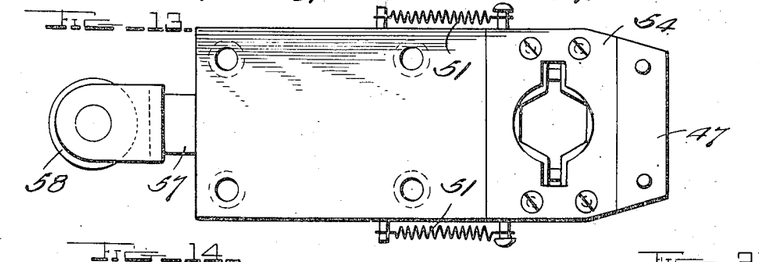
Fig. 13 is a view similar to Fig. 10 looking from the opposite side.
Figures 14, 15, 16, 17, 19, 20, 21:
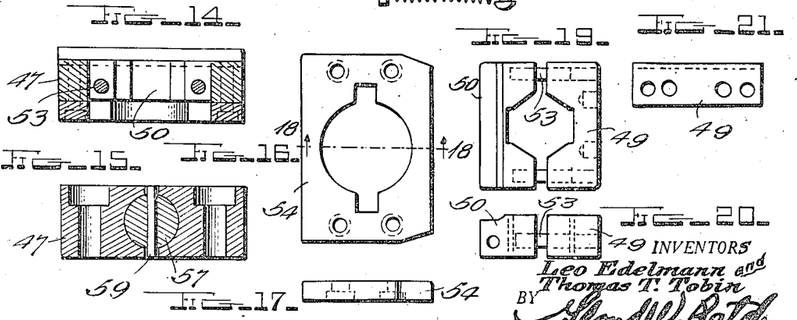
Fig. 14 is a transverse sectional view taken on line 14—14 of Fig. 10.
Fig. 15 is a transverse sectional view substantially on line 15—15 of Fig. 10.
Fig. 16 is a detail view showing the clamp jaw retaining plate.
Fig. 17 is an end elevation of the showing in Fig. 16.
Fig. 19 is a plan view showing the article or part or piece clamping jaws removed.
Fig. 20 is a view in end elevation of the showing in Fig. 19.
Fig. 21 is a front edge elevational view of the clamping jaws.
Figure 18:
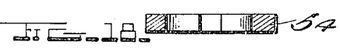
Fig. 18 is a sectional view substantially on line 18—18 of Fig. 16.

As the jaw members 49 and 50 are removable and replaceable, jaws having any desired shape or formation of article or parts receiving and holding and gripping faces can be fitted in place. In the present instance the jaws are illustrated as having a substantially hexagonal socket opening to thus receive and hold upon a correspondingly shaped part or piece and retain this part or piece against rotation while being worked upon by the tool 6. Since this invention contemplates working upon parts of different lengths, as well as different cross sectional shapes or forms, provision is made for supporting the articles while being carried by the table. As shown in Figs. 1, 5 and 9, a ring 62 is mounted and is carried on the lower side of the table 42 in substantially concentric alignment with the openings 46, and this ring has a plurality of screw threaded openings 63 formed therethrough in substantially axial alignment with the openings 46. Adjusting supporting screws 64 turned into these openings 63 have article or part supporting heads 65 thereon presented in position to receive and support an article, as illustrated at 66, in Fig. 9. By manipulating the adjusting screws 64 the height of disposition of the supporting head 65 can be varied and adjusted to accommodate the desired length of the piece or article or part 66. The adjustment of the screw 64 can be set and maintained by tightening a jamb nut 67. With this arrangement, articles or parts or pieces can be placed in the space between the open jaws 49 and 50 to rest upon and be supported by the heads 65, and when the jaws are closed the pieces or parts will be positively clamped and held in desired centered relation with respect to the tool 6, and against rotation as force is exerted against the piece or part or article by operation of the tool 6.

Figure 23:
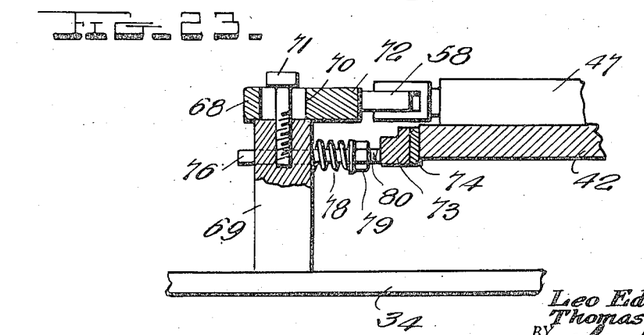
Fig. 23 is a fragmentary sectional view through the edge of the table to better show the adjustment of the clamping means and to further illustrate the brake means.

The movable clamp jaw 50 will thus be in the open position, for free and unobstructed placement or removal of the article or piece or part, at substantially all times except when each particular part is in the position to be worked or operated upon by the tool 6, and consequently as each part is brought into the working station or position, pressure exerted upon the roller 58 to move the plunger head 57 endwise will cause the clamp jaw 50 to be moved to the closed or clamping position. Such movement of the plunger head is conveniently and readily accomplished through the medium of a cam 68 disposed to engage with the rollers 58 successively as each particular clamping means is brought to the work stage or position. This clamp 68 is conveniently mounted on a standard 69, which standard is in turn carried by the connecting and supporting bar 34. As perhaps best disclosed in Figs. 3 and 23, the cam 68 is preferably provided with elongated slotted openings 70 through which fastening or clamp bolts 71 pass, so that the cam member 68 can be adjusted to vary the movement of the jaw 50 when brought to the closed position. As shown, the cam 68 has the face 72 inclined on the approach and receding sides so that smooth action of the parts in both closing and opening the movable jaw 50 will be accomplished, and it will of course be understood and appreciated that the effective clamping length of the face 72 of the cam will be such that the jaw 50 will be closed before the tool 6 comes into operation, and will not be opened until after the working interval of the tool 6 is completed.

Figure 22:
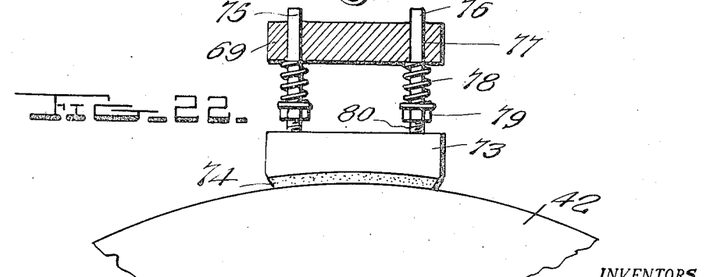
Fig. 22 is an enlarged top plan view of the brake or stop means for the work supporting and holding table.

As the pawl 29 works upon the ratchet wheel 17, the shaft 14 will be turned in the desired step-by-step movement, and means is provided to hold the table 42 against casual or forced movement except as the pawl 29 engages to turn the ratchet wheel 17 and thus impart the desired movement to the shaft 14 in the proper time and interval. To thus hold the table 42, a brake shoe 73 is provided to bear against the peripheral edge, or other desired portion, of the table 42, and this brake shoe 73 is perhaps preferably provided with a lining 74 to thus accomplish a better and more uniform functioning. This brake mechanism is perhaps best illustrated in Figs. 22 and 23, and the slide rods 75 and 76 extending from the brake shoe member 73 are slidably received through bearing openings 77 in the supporting standard portion 69. Springs 78 are fitted around the two slide rods 75 and 76, and extension adjusting nuts 79 are provided on screw threaded portions 80 of the slide rods 75 and 76 so that the bearing tension of these springs can be adjusted. In this manner, the braking force can be varied and adjusted through tne adjusting nuts 79. Of course, other forms of brake structure can be applied at any desired point, and the mounting of this brake structure can be as described, or at any other desired and convenient location.

With the parts as described, the table 42 will be rotated in step-by-step movement to bring the various clamp structures successively into position to clamp an article or part or piece therein in position to be worked or operated upon by the tool 6, and by actuation of the control wheel or handle structure 8, the spindle 4 can be lowered manually to bring the tool 6 into operating position and to withdraw or again raise the tool 42 during the interval of pause of the table 42. However, it is preferable that means be provided to automatically accomplish the downward and upward movement of the spindle 4 to thus lower and raise the tool 6. To this end, an eccentric disk 81 mounted on the shaft 21 is provided with an eccentric pin or crank 82. An operating rod 83 is connected at one end on the eccentric or crank pin 82, and is extended to and through a part 84 of the tool raising and lowering mechanism. These parts can be provided with rack and pinion or lever or other suitable motion transmitting means and connections so that the revolution of the shaft 21 will cause the tool 6 to be lowered to a working position and to be again withdrawn or raised, while the table 42 remains stationary in the interval between the step-by-step progressive rotation thereof. As has been stated, the spindle 4 can have a reversing head 9 thereon, and thus when a tapping tool is employed at 6, the tool will be turned into the bore to be tapped and the reversing head 9 will then cause reversal of rotation of the tool to turn the tap from the opening. Obviously, parts or pieces or articles can be externally screw-threaded by employment of a die, and the reversing head 9 will accomplish the proper reverse rotation to release the die.

With the parts constructed and operating as set forth, tool 6 is continuously operated, and the shaft 21 is also constantly or continuously rotated. The rotation of this shaft 21 causes the table 42 to be rotated in step-by-step movement, and to pause in the interval while the pawl 29 is being returned. Thus, each article or part or piece holding clamp or means is brought successively into substantially working registry beneath the tool 6. The cam 68 closes the clamping jaws to hold the article or piece or part while in this position to be worked upon, and the brake shoe structure at 73 retains the table in proper registry during the period or time of pause, which is the working interval. The eccentric pin at 82 is rotated in a concentric path by the revolution of shaft 21, and this eccentric movement is so timed that the rod 83 is actuated to cause the tool 6 to be lowered into working position to accomplish the desired operation upon the part or piece in this working interval while the table is held stationary, and to again raise the tool before the successive stepped rotational movement of the table is initiated.

As has been stated, the tool 6 can be a drill, tap, die, or some other rotated working tool, and a reversing head can be provided at 9, where such reversal is desirable or necessary. Also, for channelling or other planing or forming operations, the tool 6 can be actuated with only a reciprocating movement, and without rotational working movement. However, as such various tool and operating means and mechanisms therefor are well known in the art no attempt is here made to disclose or describe all such adaptations in detail.

With the mechanism functioning in this manner, the parts or pieces or articles to be worked upon are fitted between the several sets of clamping jaws on the approach side before the working position is reached, and the jaws are opened as the particular clamping means leaves or travels away from the working position so that the part or piece or article can be readily removed.

Figure 3:
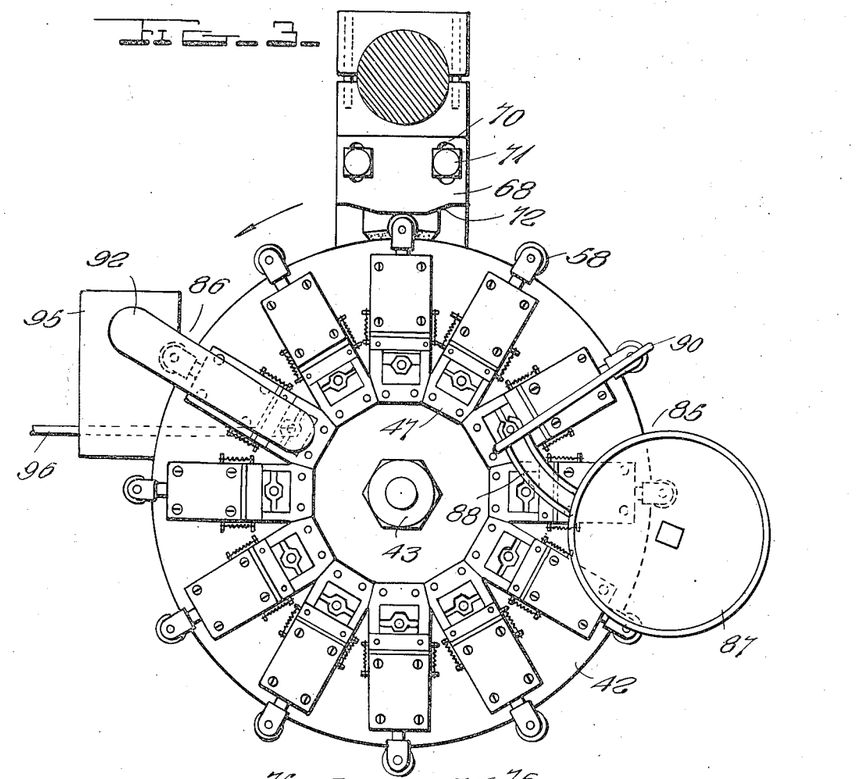
Fig. 3 is a fragmentary view similar to Fig. 2 showing feed and discharge means.

In Fig. 3 means is shown, generally, at 85, for placing parts or pieces or articles in place within the clamp jaws to be gripped and held between these jaws when the working position is reached, and then means is disclosed at 86, for removing the parts or pieces or articles as the table travels or is moved to carry the articles from the working position.

Figure 24:
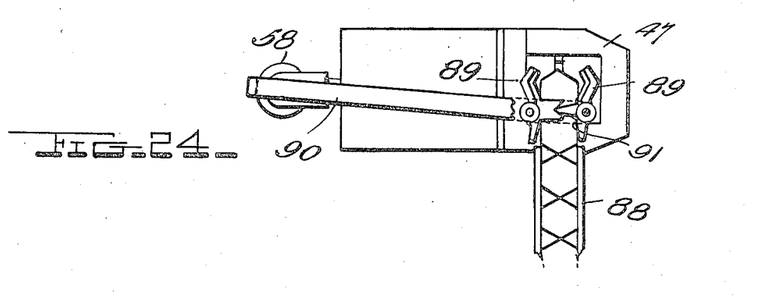
Fig. 24 is an enlarged top plan view illustrating an embodiment of parts or article feeding means suitable for employment in our invention.
Figures 25, 26:
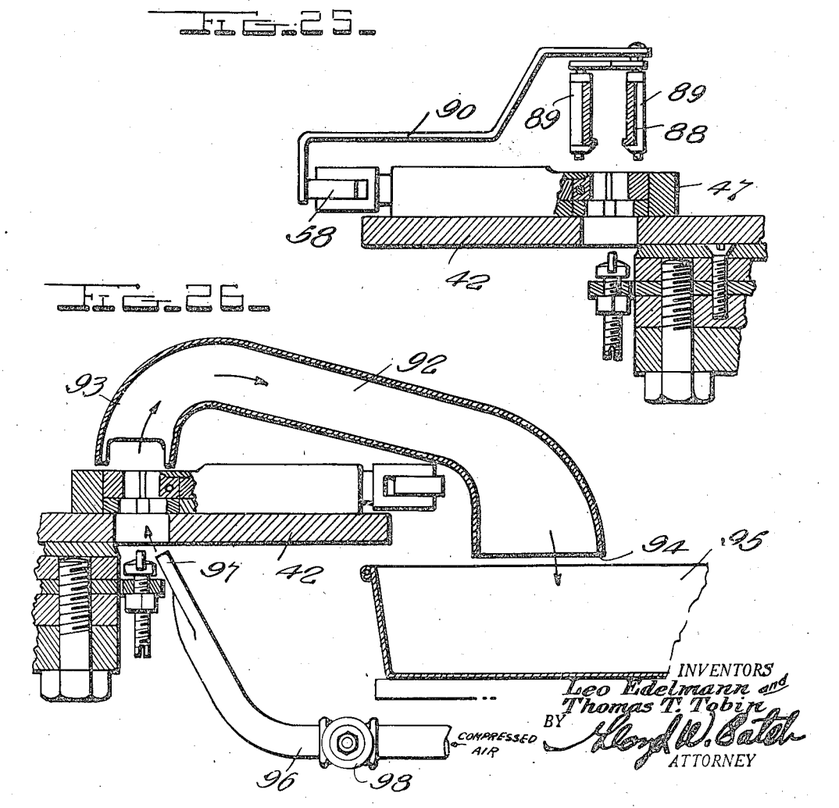
Fig. 25 is a fragmentary sectional view through an edge of the work supporting table and illustrating the parts or article feeding means in side elevation.
Fig. 26 is a fragmentary sectional view through an edge of the table showing one form of article discharge means capable of employment in my invention.

Various forms of feeding means can be employed, and therefore the means disclosed in the present instance is intended to be only more or less illustrative. A hopper 87, or other container for parts or pieces or articles has a conveying tube 88 extending therefrom with its discharge end located substantially in line with the concentric path in which the various clamp jaw portions are moved and carried as the table 42 is rotated. The articles will be fed or supplied from the hopper 87 to this conveying tube 88 to be made available at the discharge end in properly up-ended or other desired disposed relation, so that when the parts or pieces or articles are individually placed within the spaces between the clamp jaws, where they rest upon the supporting heads 65, they will be presented with the portion to be worked upon disposed in position to be accessible to the tool 6, substantially after the manner shown in Fig. 9. As the parts are to be fed singly, the conveying tube 88 must be provided with some means to discharge a single part or piece or article at the proper interval, and to hold back or stop discharge of a successive part until the next successive pair of clamp jaws is in proper position. One arrangement for accomplishing such feed is shown in Figs. 24 and 25, where the tube 88 has the jaws or gate members 89 swingably mounted at the end thereof to be opened by contact of the roller 58 of each clamping means with the operating arm 90. The jaws or gate members 89 are provided with stops 91 to close the tube 83 so that but a single part or piece or article will be discharged.

In Fig. 26 one form of means is illustrated that can be conveniently used at 86, for discharging or removing the parts or pieces or articles. In this adaptation, a conveying discharge tube 92 is placed with its opening receiving end 93 above the position occupied by the jaws of one of the holding means after the part has been carried from the working position, and this tube is curved upwardly and is carried over outwardly to have its end 94 open above a tray or pan or other receptacle 95 positioned to receive the discharge parts or pieces or articles. A compressed air supply pipe 96 leads beneath the table 42 and is provided with a blast discharge nozzle 97 disposed substantially beneath the end 93 of the discharge tube 92, and constructed to direct an air blast upwardly through the openings 46 of the table 42 and the registering openings of the respective jaws. With this arrangement, the compressed air blast is directed against the lower side of the part or piece or article after the work has been accomplished thereon and the clamping jaws have been released, and this blast will exert sufficient force to lift or blow the part upwardly to be directed by the curved discharge tube 92 outwardly and then downwardly into the receptacle 95. A compressed air supply control valve can be provided at 98, and under some conditions it may be found desirable to include some automatic control means so that the compressed air supply pipe 96 will be opened only during the discharge interval; but, as such valve control means are now well known no particular adaptation will be here illustrated or described in detail.

Figure 4:
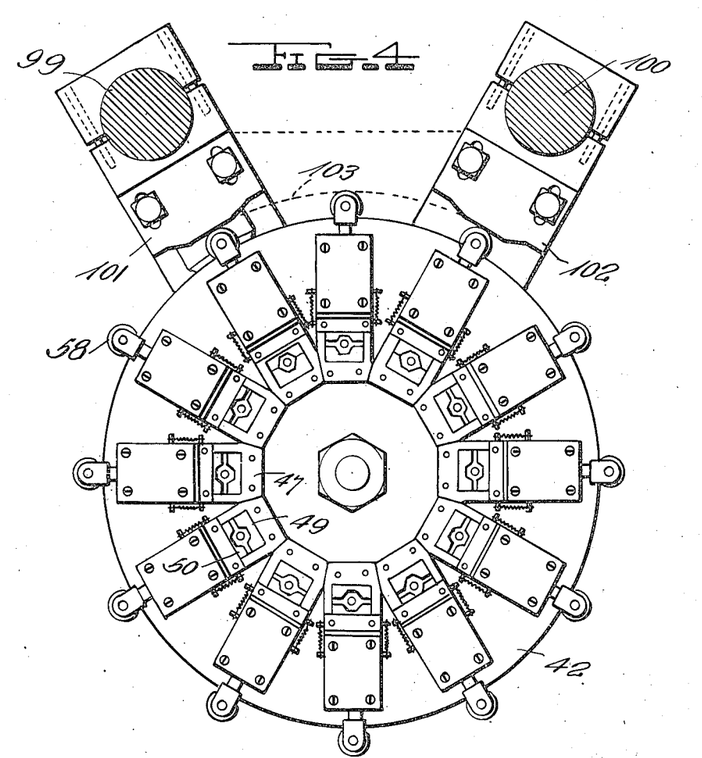
Fig. 4 is a showing similar to Fig. 3 disclosing an embodiment in which multiple operations are accomplished.

In Fig. 4 we have illustrated an adaptation for accomplishing a plurality of working operations upon a single piece or part or article, and it will be appreciated that in the same manner a multiplicity of working operations can be carried out. The two posts 99 and 100 are illustrative of posts of drill presses or other working means, and these posts are so placed that tools or working parts thereof will be in substantial registry with the openings of two spaced and separate sets of jaws. Separate cams for closing the jaws in each of these work positions can be provided as at 101 and 102, or a single long cam can be employed, somewhat after the manner illustrated by the dotted lines at 103. With this arrangement, the post 99 can carry a boring tool and the post 100 may support a tapping tool, and thus two successive but somewhat related operations can be performed. Extending this thought, a third post and associated working parts might be provided in successive position with a die externally screw threading a part previously bored and internally threaded; and, in advance of the post 99 still another working mechanism can be provided with a tool externally working upon the part or piece or article.

In like manner, by increasing the number of working mechanisms, substantially any desired number of working operations can be carried out between the placement or supply of the part or piece or article and the discharge thereof. Under some conditions it may be found desirable or necessary to make the table 42 of relatively larger size or diameter so that a greater number of clamping means may be carried thereby, and under other conditions a lesser number may be found advantageous.

From the foregoing it will be seen that this invention provides a machine for handling and making parts or pieces or articles which is of such construction and is operated in such manner that the working is substantially automatic, and that a number of parts or pieces or articles can be handled and be worked upon or shaped or formed, by various operations, expeditiously and economically and with a minimum of manual manipulation and attention.

While we have herein shown and described only certain specific constructions and arrangements and associations and operations of the parts, it will be appreciated that many changes and variations can be made and resorted to, to suit different conditions of use and different parts or pieces or articles being handled and worked upon, without departing from the spirit and scope of our invention.

We claim:

1. An article handling and making machine comprising, with a mechanism to work upon the article, a table rotatably carried adjacent to said mechanism, a plurality of adjustable clamp and holding means carried by said table substantially concentrically around the axis of rotation and constructed to receive and hold articles to be presented to the working mechanism, said adjustable means being adapted to be adjusted to receive and hold articles of various shapes and sizes, means to dispose and retain the articles thus held at desired adjusted elevations with respect to the mechanism to work thereon, means to rotate said table in step-by-step movement to bring the articles thereon successively into position to be worked upon, means to actuate said clamp and holding means to grasp and securely hold the article while being worked upon, and means to retain said table substantially immovable in the intervals between the step-by-step movement.

2. An article handling and making machine comprising, with mechanism to work upon an article, a work supporting table rotatably mounted with a portion thereof in article supporting position adjacent to the mechanism to work upon the article, a plurality of clamp means carried on said table provided with clamping jaws to receive and hold an article positioned in predetermined relation with respect to the mechanism to work thereon, means normally holding said clamp means in open position for ready reception and removal of an article, means to rotate said table in step-by-step movement whereby the clamp means thereof successively carry the articles into position to be worked upon, means to close said clamp means to grip and hold the articles during the interval of operation thereon, said clamp means having the article receiving and holding parts thereof changeable to accommodate and hold articles of various sizes and shapes, and adjustable means adjacent to each clamp means for regulating the extent of projection of the article from the clamp means and consequently holding the article at desired elevation with respect to the mechanism to work upon the article.

3. An article handling and making machine for use with a drill press and like mechanism comprising, a rotatably mounted table, means positioning said table to rotate with a part thereof adjacent to a working part of the drill press mechanism, a plurality of clamp means at spaced apart locations around and upon said table to receive and hold a plurality of articles in position to be worked upon by the working means of the drill press, means to rotate said table in step-by-step movement to successively bring the articles carried and held thereon into position to be worked upon by the working mechanism of the drill press, synchronized means to operate the working parts of the drill press in those intervals between the step-by-step rotary movement of the table when an article is paused and presented in position to be worked upon, said clamp means being normally open for free reception and removal of articles, means to close said clamp means to grip and retain the article being worked upon, adjustable means to hold the article at the desired adjusted elevation to be worked upon, means to supply the articles to said clamp means upon the approach side of the station where operated upon, and pneumatic means to remove the articles from the clamp means after said articles have been operated upon.

4. An article handling and making machine comprising with mechanism to work upon the article, a table rotatably carried adjacent to said mechanism, a plurality of article holding means on said table each having one fixed jaw and one movable jaw and adapted to receive and hold articles to be worked upon between said jaws, spring means normally holding the movable jaw portions separated from the fixed jaws in article receiving relation, means to rotate said table in step-by-step movement to bring articles inserted between the jaws of the article holding means successively into position to be worked upon, and cam means outside of the periphery of said table successively engaging with the movable jaw portions of each article holding means as the particular article holding means approaches the working position to thereby clamp an article between said jaws in a working interval and disengaging said movable jaw portion as the particular article holder moves away from the working position.

5. An article handling and making machine comprising with mechanism to work upon the article, a table rotatably carried adjacent to said mechanism, a plurality of article holding means on said table each having one fixed jaw and one movable jaw and adapted to receive and hold articles to be worked upon between said jaws, spring means normally holding the movable jaw portions separated from the fixed jaws in article receiving relation, means to rotate said table in step-by-step movement to bring articles inserted between the jaws of the article holding means successively into position to be worked upon, cam means successively engaging with the movable jaw portions of each article holding means as the particular article holding means approaches the working position to thereby clamp an article between said jaws in a working interval and disengaging said movable jaw portion as the particular article holder moves away from the working position, and friction brake means engaging with said table and holding said table in fixed and immovable positions intermediate the exertion of force accomplishing the step-by-step movement thereof.

6. An article holding and making machine for use with a drill press supported upon a post carried by a base comprising a rotatable supporting post carried by said base and spaced from the post, a table carried by said rotatable post and consequently rotatably movable with a portion thereof traveling adjacent to the operating parts of the drill press, a plurality of article holding clamp means at spaced-apart locations upon said table peripherally aligned to present articles held thereby in position to be worked upon by the working means of the drill press, said article holding clamp means each having a fixed jaw and a movable jaw, springs normally separating the jaws to receive an article dropping thereinto, operating means on said base rotating said supporting shaft in step-by-step movement and carrying said table in like manner and presenting the article holding clamp means successively beneath the working part of the drill press, link means connected between said supporting standard and supporting shaft holding the table against movement to disalign the article holding clamp means with respect to the working means of the drill press, cam means carried by said connecting link engaging with and closing the movable jaw of each article holding means upon approach to the working position and releasing the jaw as the particular article holding means passes away from the working position, brake means carried by said link frictionally holding against said table and retaining the table against movement except under the impulse of the driving means, and means also on the base synchronized with the means accomplishing step-by-step movement moving the working parts of the drill press into and out of working position.

7. An article handling and making machine comprising a base structure, a supporting standard rising from said base structure, a tubular housing rising from said base structure at a location spaced from the supporting standard and provided at its upper end with a bearing, a shaft revolubly mounted in said housing, a work supporting table carried and revolved by said shaft, a plurality of article receiving and holding jaw structures on said supporting table peripherally spaced apart around the rotating center thereof having a fixed jaw and a movable jaw, spring means resiliently urging the movable jaw to an open position, an extension on each movable jaw projecting substantially radially beyond the periphery of the table, work means carried by the supporting standard with the working part thereof positioned in alignment with the work holding means on the table, means to rotate the shaft and consequently the table in step-by-step movement to bring the work holding clamp means successively into position with respect to the working means, and a cam held in position by the supporting standard engaging with the radially extending portions on the movable jaw to close the movable jaw when the table is moved to bring an article into position to be worked upon.

8. An article holding and making machine comprising a base structure, an upright supporting standard at one side of said base structure, a housing upstanding in upright relation from said base structure at a location spaced from the supporting standard, a shaft rotatable in said housing, a work supporting table carried by said shaft, mechanism carried by said supporting standard having a tool presented above said table and inwardly from the periphery thereof, a plurality of spaced apart openings in said work supporting table aligned substantially in registry with the tool, means rotating said shaft in step-by-step movement to similarly rotate the table and bring the openings thereof successively beneath the tool, a plurality of fixed clamp jaws on said table adjacent to the openings, a plurality of cooperating movable clamp jaws adjacent to said fixed clamp jaws having portions extending therefrom substantially radially beyond the periphery of the table, means to feed articles to be worked upon to the clamping jaws at a stopped position of the table in advance of the position at which the openings and consequently the jaws register with the working tool, adjustable supporting means within the openings to hold the articles at an elevation to be worked upon, cam means carried by the supporting standard beyond the periphery of the work holding table successively engaging with the extensions of the movable clamp jaws and closing said jaws to grip the article to be worked upon as the article approaches the tool and release the movable jaw as the table moves to carry the article from the working position, and brake means engaging with the periphery of the table holding the table in position in the intervals between the step-by-step movement.

9. An article holding and making machine comprising a base structure, an upright supporting standard at one side of said base structure, a housing upstanding in upright relation from said base structure at a location spaced from the supporting standard, a shaft rotatable in said housing, a work supporting table carried by said shaft, mechanism carried by said supporting standard having a tool presented above said table and inwardly from the periphery thereof, a plurality of spaced apart openings in said work supporting table aligned substantially in registry with the tool, means rotating said shaft in step-by-step movement to similarly rotate the table and bring the openings thereof successively beneath the tool, a plurality of fixed clamp jaws on said table adjacent to the openings, a plurality of cooperating movable clamp jaws adjacent to said fixed clamp jaws having portions extending therefrom substantially radially beyond the periphery of the table, means to feed articles to be worked upon to the clamping jaws at a stopped position of the table in advance of the position at which the openings and consequently the jaws register with the working tool, adjustable supporting means within the openings to hold the articles at an elevation to be worked upon, cam means carried by the supporting standard beyond the periphery of the work holding table successively engaging with the extensions of the movable clamp jaws and closing said jaws to grip the article to be worked upon as the article approaches the tool and release the movable jaw as the table moves to carry the article from the working position, brake means engaging with the periphery of the table holding the table in position in the intervals between the step-by-step movement, and pneumatic means having an upwardly directed nozzle beneath the table at a position in registry with the openings of the table in a stopped position beyond the step-by-step position where the article is worked upon.

THOMAS T. TOBIN.
LEO EDELMANN.